US006568856B2

(12) United States Patent
Sugimori et al.

(10) Patent No.: US 6,568,856 B2
(45) Date of Patent: May 27, 2003

(54) ROLLING BEARING

(75) Inventors: Youichiro Sugimori, Kanagawa (JP);
Hisao Sumiya, Kanagawa (JP);
Michiharu Naka, Kanagawa (JP);
Takashi Ogawa, Kanagawa (JP);
Yasuhisa Terada, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/998,307

(22) Filed: Dec. 3, 2001

(65) Prior Publication Data
US 2003/0012470 A1 Jan. 16, 2003

(30) Foreign Application Priority Data
Dec. 4, 2000 (JP) ........................................ 2000-368551

(51) Int. Cl.[7] ............................ F16C 33/66; F16C 33/58
(52) U.S. Cl. ........................................ 384/462; 384/516
(58) Field of Search ................................. 384/462, 464, 384/516

(56) References Cited
U.S. PATENT DOCUMENTS
5,575,569 A * 11/1996 Shinohara ................... 384/470

6,082,906 A     7/2000 Satou et al.
6,329,326 B1 * 12/2001 Iso et al. ..................... 384/462
6,432,887 B1 * 8/2002 Yamamoto et al. ......... 384/462

FOREIGN PATENT DOCUMENTS
JP            3035818 A      2/2000
JP     2000-328087 A    11/2000

* cited by examiner

Primary Examiner—Thomas R. Hannon
(74) Attorney, Agent, or Firm—Sughrue Mion, PLLC

(57) ABSTRACT

A rolling bearing to exhibit outstanding initial (cage) acoustic characteristics at the start of operation under a low temperature atmosphere, suppress fretting damages (abrasions) and reduce bearing torque by making the radius of curvature of the cross-sectional shape of the inner raceway and the radius of curvature of the cross-sectional shape of the outer raceway equal to 51.0% to smaller than 60.0% of the diameter of the rolling element, and packing a grease composition comprising a base oil that is a mixture of a lubricant containing a polar group in its molecular structure and a non-polar lubricant and a metallic soap-based thickener containing a long-fiber material with a major axis part length of at least 3 μm.

23 Claims, 7 Drawing Sheets

___ : 1μm  MAGNIFICATION: 6,000 TIMES

___ : 1μm  MAGNIFICATION: 6,000 TIMES

RADIUS OF CURVATURE OF CROSS-SECTIONAL
SHAPE OF INNER RACEWAY (GROOVE R) IN %

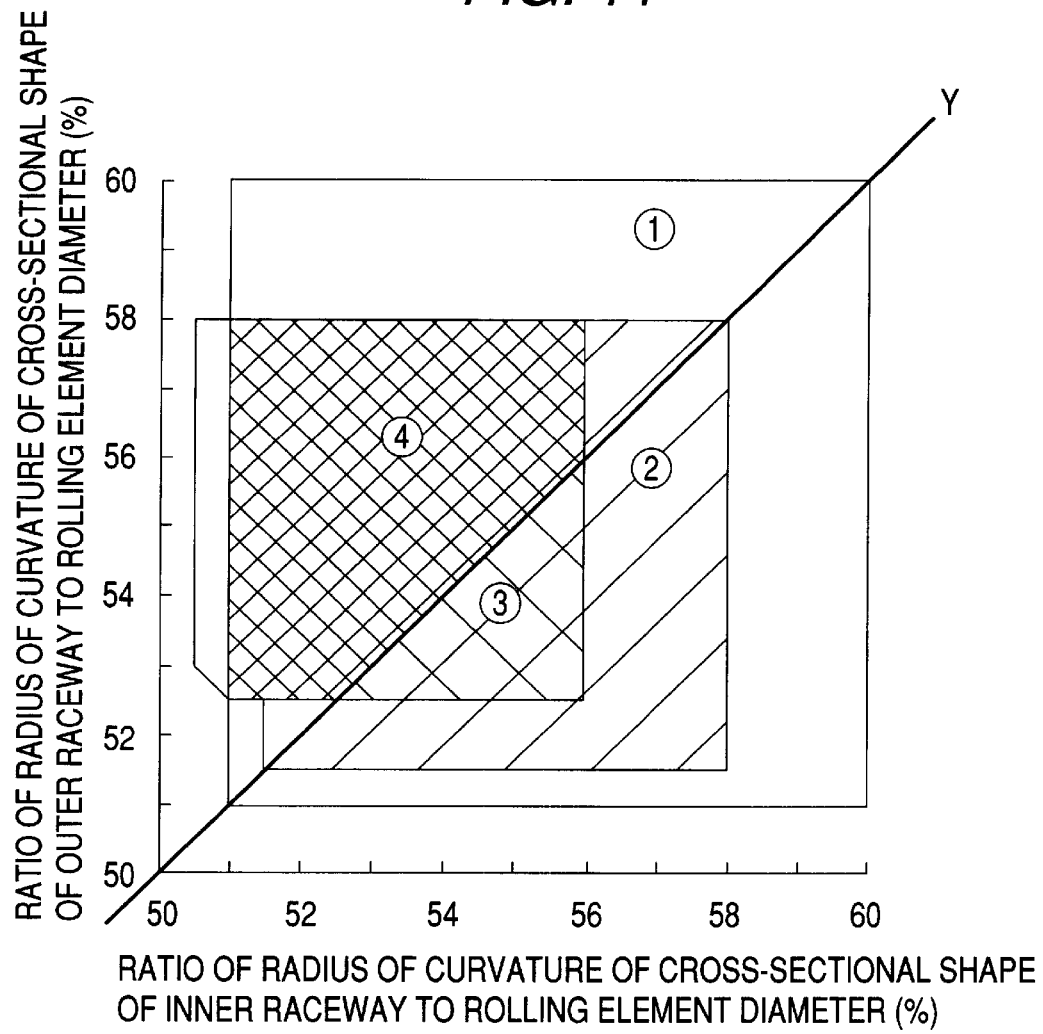

ROLLING BEARING

FIELD OF THE INVENTION

The present invention relates to rolling bearings for use in various types of motors for general industrial applications, and in particular those designed to improve the cage noise under low temperature conditions, and to decrease fretting damages (abrasion) and bearing torque.

BACKGROUND OF THE INVENTION

The driving motor unit used for an air conditioning apparatus (which will be called air conditioner hereinafter) is a typical example of general-purpose motors. Air conditioners are recently provided with ever-improved performance and multi-functions; for example, with the aid of inverter control, they first lower the room temperature very quickly in a short time by a high-speed operation, and then keep the room temperature constant by a slow-speed operation. Accompanying this, a low noise operation is required in which the blowing-out sound as well as the rotating sound of the motor is well suppressed. However, due to the decrease of the cooling efficiency inside the apparatus during the slow-speed operation, the temperature of the rolling bearings installed in the motor sometimes rises to 100 to 120° C. Thus, it becomes difficult to secure the appropriate oil film thickness for lubrication, and further the grease packed in the rolling bearings tend to deteriorate. When the deterioration proceeds, noise generates.

For the outdoor unit of an air-conditioner, the initial noise associated with the bearing sound (cage sound) when the conditioner is started to operate under a low temperature condition such as in winter becomes a problem in some cases.

Furthermore, the motor units of air-conditioners with rolling bearings installed therein are sometimes transported over long distances from a motor manufacturer to end users by a truck. In such a long distance transportation, the truck traces the fine unevenness of roads, and the associated movement is transmitted to the rolling bearing in the form of repetitive impact loads, which cause the rolling element of the rolling bearing to repeatedly put into microscopic contact with the raceway surface. Such microscopic contacts sometimes cause a fretting damage (abrasion) on the raceway surface, and the damage acts as a source of noise.

On the other hand, air-conditioners are being made more compact in size and lower in power to decrease the heat generated by the motor by taking into consideration environmental regulations in addition to the trend of high performance as well as multi-function. Accordingly, for the rolling bearing for these uses, torque characteristics are regarded as one of the most significant features. The dynamic frictional torque of a rolling bearing is caused by the friction due to the microscopic sliding of the rolling contact surface, the sliding friction at the sliding contact part in the bearing and the viscous resistance of the grease. Among these causes, the viscous resistance of the grease is known to depend on the kinematic viscosity of the base oil and the penetration of the grease. Since the kinematic viscosity of the base oil is associated with the shear resistance of the oil when a fluid lubricating film is formed, the reduction of kinematic viscosity is an important role for the reduction of the dynamic frictional torque of the rolling bearing. Further, since grease penetration is related to the channeling behavior when the grease is subjected to a shear force in the bearing during the rotation of bearing, the decrease of the penetration is also quite effective.

However, when the kinematic viscosity of the base oil is reduced, it becomes difficult to secure an appropriate thickness of the oil film since the motor for air-conditioners is driven at a relatively slow speed by invertor control as described hereinabove. Moreover, those oils, which have a low kinematic viscosity, generally exhibit a low heat resistance, which suffers from a problem in acoustic durability. On the other hand, the reduction of grease penetration demands the increase in the content of the thickener whereby the quantity of the base oil in the grease relatively reduces. These changes raise the resistance of the grease to mechanical shearing forces, resulting in the reduction of the quantity of the base oil supplied to the lubricating surface of the bearing. Therefore, it becomes impossible to stably secure the lubricating capability over a long period of usage.

It is thus evident that the reduction of the kinematic viscosity of the base oil and the reduction of grease penetration suffer from practical restrictions; for rolling bearings used for the above-cited applications, a suitable range of the kinematic viscosity at 40° C. is 10 to 500 mm$^2$/s and the grease penetration is preferably of NLGI No. 2 to 3 grade. In other word, 5 to 20% by mass of the content of the thickener is regarded appropriate. In the motor to which the low noise property, that is, the acoustic durability is demanded, a grease is used that contains an ester as the base oil, and the lithium salt of a fatty acid as the thickener. The ester oil exhibits a better heat resistance compared with mineral oils, and has a function of enhancing the acoustic durability due to the presence of polar groups in the molecular structure, since the polar groups are strongly adsorbed onto metal surfaces to improve abrasion resistance. Further in cases where fretting damages (abrasion) is required to reduce, it is well known that use of a relatively high viscosity of base oil capable of forming a stable oil film is effective.

The radii of curvature of the cross-sectional shapes of the inner and outer raceways can be designed in various manners depending on the level of load and rotating speed. But usually the radius of curvature of the inner raceway as well as the outer raceway is made equal to 52% of the diameter of the ball. This is based on the fact that, in Interpretative Table 2 'Radii of raceway grooves and decreasing coefficient' of "Method of Calculating Dynamic Load Rating and Standard Life of Rolling Bearing—Interpretation" in JIS standard (JIS B 1518-1992), the radius of curvature of the cross-sectional shape is made equal to 52% of the diameter of the rolling element for the calculation of the dynamic load rating of a deep groove ball bearing. Also, in the bearing catalogue published by the present applicant, dynamic and static load rating are calculated with the assumption of the radii of curvature of the cross-sectional shapes of the inner raceway and the outer raceway being 52% of the diameter of the rolling element. As is seen from these facts, the radii of curvature of the cross-sectional shapes of the inner raceway and the outer raceway are usually made equal to 52% of the diameter of the rolling element.

Corresponding to the market trend of making air conditioners more advanced in performance and provided with multi-functions, and also considering environmental regulations, the specifications of the rolling bearing installed in the air conditioners are expected to achieve improved acoustic characteristics, the reduction of fretting damages (abrasion) and a lowered torque. Such needs will probably be more and more urgent and serious in the future.

SUMMARY OF THE INVENTION

Accordingly, the invention, which has been devised under such circumstances, has an object of providing rolling bearings that improve in the initial acoustic (case noise) characteristics at the start of operation under low temperature conditions, and that are designed to achieve reduced fretting damages (abrasion) and a reduced bearing torque.

To achieve the object, the invention provides the following rolling bearing.

(1) A rolling bearing comprising an outer ring having on its inner periphery an outer raceway, an inner ring having on its outer periphery an inner raceway, plural rolling elements arranged between said outer raceway and said inner raceway in a freely rotatable manner, a cage holding said plural rotatable elements in a freely rotatable condition, and a grease packed in the space between said outer raceway and said inner raceway, said grease comprising a base oil composed of a lubricant having a polar group in its molecular structure and a non-polar lubricant, and a metallic soap-based thickener containing a long-fiber material whose major axis part length is at least 3 $\mu$m, and the radius of curvature of the cross-sectional shape of said inner raceway and the radius of curvature of the cross-sectional shape of said outer raceway being in the range of from 51.0% to smaller than 60.0% of the diameter of said rolling element.

(2) A rolling bearing comprising an outer ring having on its inner periphery an outer raceway, an inner ring having on its outer periphery an inner raceway, plural rolling elements arranged between said outer raceway and said inner raceway in a freely rotatable manner, a cage holding said plural rotating elements in a freely rotatable condition, and a grease packed in the space between said outer raceway and said inner raceway, said grease comprising a base oil composed of a lubricant having a polar group in its molecular structure and a non-polar lubricant, and a metallic soap-based thickener containing a long-fiber material whose major axis part length is at least 3 $\mu$m, and the radius of curvature of the cross-sectional shape of said inner raceway being in the range of from 50.5% to 56% of the diameter of said rolling element, and the radius of curvature of the cross-sectional shape of said outer raceway being in the range of from 53.0% to 58.0% of the diameter of said rolling element.

In the rolling bearing of the invention, bearing torque can be reduced due to the use of the above-specified grease composition. The long-fiber material having a major axis part length of at least 3 $\mu$m contained in the thickener for the grease composition is oriented by the shearing force exerted by the rotation of the bearing, and acts to reduce the bearing torque. This bearing torque-reducing effect is further enhanced by jointly using a non-polar lubricant in the base oil. Further, the lubricant having a polar group in its molecular structure (which will be called polar group-containing lubricant hereinafter) contained in the base oil plays a role similar to that of the conventional polar group-containing base oil (such as ester oils). The polar group is preferentially adsorbed on the contact surface for the rotary part of the bearing to form an adsorption film, which reduces the bearing torque through the improvement of surface frictional property. Still further, the polar group-containing lubricant interacts with the long-fiber material comprising the micelle structure of the metallic soap to reduce the bonding force between the long-fiber materials. Hence, the shear resistance of the grease during bearing rotation is reduced, resulting in a further reduction of bearing torque. Because of such mechanisms, even if the radius of curvature of the cross-sectional shape of the inner raceway or the outer raceway is made smaller than 52% of the diameter of the rolling element, an improved dynamic torque property is achieved compared to the property achieved in conventional specifications provided that the radius of curvature is at least 51% of the diameter of the rolling element.

By making the radius of curvature of the cross-sectional shape of the inner raceway or the outer raceway 51.0% to smaller than 60.0% of the diameter of the rolling element, or by making the radius of curvature of the cross-sectional shape of the inner raceway 50.5% to 56% of the diameter of the rolling element, and the radius of curvature of the cross-sectional shape of the outer raceway 53.0% to 58.0% of the diameter of the rolling element, the elastic deformation of the contact portion in the rolling surface of the rolling element with the inner raceway surface or the outer raceway surface is reduced. In other words, the Hertian contact ellipse becomes smaller, thus the differential slippage is reduced, resulting in the reduction of bearing torque. Simultaneously, against the impact loading repetitively applied during transportation, fretting damages (abrasion) can be reduced which occur at the inner raceway surface or the outer raceway surface, leading to the improvement of acoustic durability. With a radius of curvature of the cross-sectional shape of the inner raceway or the outer raceway larger than the upper limit mentioned above, the maximum Hertian contact pressure at the contact elliptic area becomes too large, thus shortening the rolling fatigue life of the inner raceway or the outer raceway. Hence, an unfavorable acoustic property and a short flaking life result. By making the radius of curvature of the cross-sectional shape of the outer raceway larger than the radius of curvature of the cross-sectional shape of the inner raceway, the contact surface pressure between the rolling surface of the ball and the inner raceway or the outer raceway can be decreased.

Since the rolling bearing of the invention can reduce the friction acting between the raceway surface of the rolling element and the outer raceway and the inner raceway during the relative revolution of the outer ring and inner ring, heat generation inside the rolling bearing can be effectively suppressed. As a result, the deterioration of the grease composition packed in the bearing is prevented to secure improved acoustic durability for the rolling bearing.

BRIEF DESCRIPTION OF THE DRAWINGS

FIG. 11 is a graph showing the relationship between the ratio of the radius of curvature of the cross-sectional shape of the inner raceway to the diameter of the rolling element and the ratio of the radius of curvature of the cross-sectional shape of the inner raceway to the diameter of the rolling element, which are preferred in this invention.

EXPLANATION OF NUMERALS AND SIGNS

Figure 1:
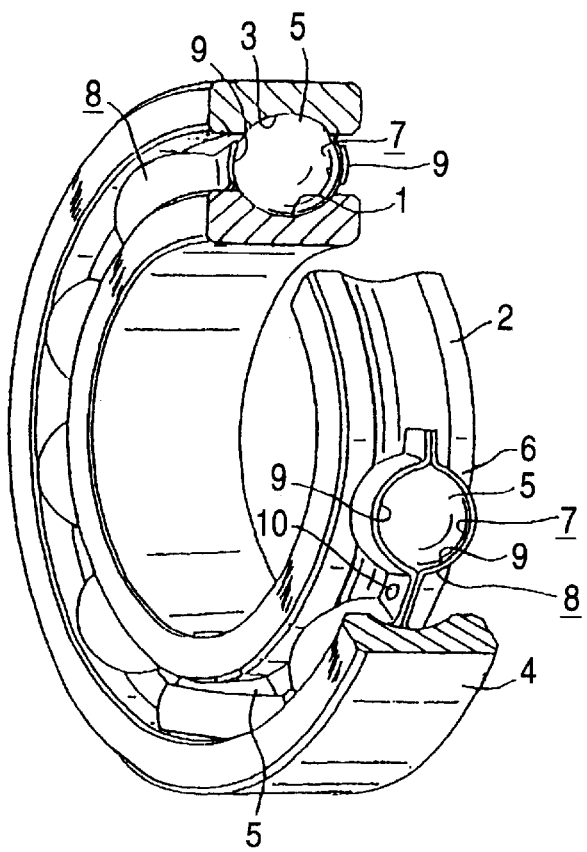
FIG. 1 illustrates one example of the rolling bearing belonging to the scope of the invention in the form of a partially sectional oblique perspective view.

1. Inner raceway
2. Inner ring
3. Outer raceway
4. Outer ring
5. Ball
6. Cage
7. Pocket
8. Element
9. Concave part
10 Rivet
11 Cage
12 Main body
13 Elastic piece
14 Concave part
20 Housing
21 Test bearing
22 Coil
23 Rotor
30 Measuring apparatus for torque test
31 Test bearing
32 Air spindle
33 Shaft
34 Pre-loading wave washer
35 String
36 Load converter
37 X-Y recorder
40 Measuring apparatus for fretting test
41 Test bearing
42 Housing
43 Shaft
44 Vibrator

DETAILED DESCRIPTION OF THE INVENTION

Now, the rolling bearing of the invention will be explained in detail with reference to drawings.

In the invention, there is no limitation on the structure of the rolling bearing itself except the dimensional relationship between the radius of curvature of the cross-sectional shape of the inner raceway or the outer raceway and the diameter of the rolling element. Hence, one can design a rolling bearing such as illustrated in FIG. 1 as an example. The rolling bearing shown in the figure comprises an inner ring 2 having at its outer periphery an inner raceway 1, an outer ring 4 having at its inner periphery an outer raceway 3, both rings being arranged concentrically, and plural balls 5, 5 as the rolling elements between inner raceway 1 and outer raceway 3 in a freely rotatable manner. Both of inner raceway 1 and outer raceway 3 are of deep groove type, and balls 5, 5 are held in pockets 7, 7 provided in cage 6 in a freely rotatable manner.

Cage 6 is of a type called a ribbon cage (corrugated press cage), which comprises a pair of two elements 8, 8 fabricated to form a circular structure, each element having been fabricated into a corrugated form by press molding a metal plate. Elements 8, 8 have at plural sites along their circumferential directions plural concave parts 9, 9 of roughly semi-circular shape to provide pockets 7, 7. A pair of elements 8, 8 of such a structure is butted at the portion beside concave part 9, 9, and bonded together with plural rivets 10 to give a circular cage 6 having plural pockets 7, 7 arranged along the circumferential direction thereof. The inner middle portion of each concave part 9, 9 is processed to be a spherically concaved surface having an arc cross-section with a radius of curvature slightly larger than a radius of curvature of the rolling surface of each ball 5, 5.

Figure 2:
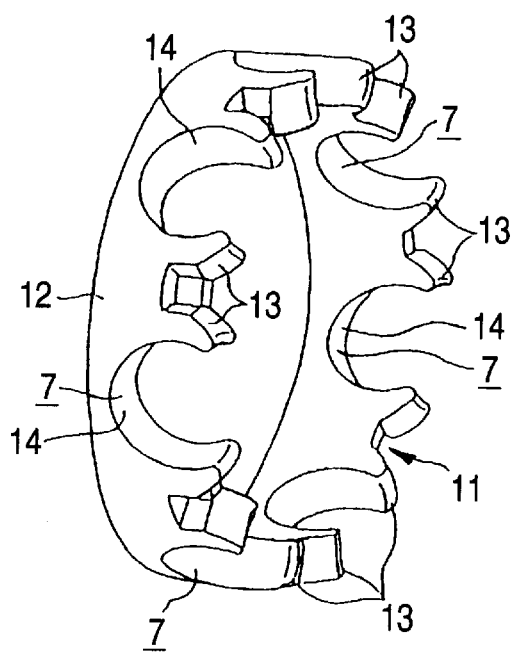
FIG. 2 is an oblique perspective view of another example of a cage to be installed in the rolling bearing.

Alternatively, another cage 11 called crown-type cage can be used as is shown in FIG. 2. This type of cage 11 has at plural sites along the circumferential direction of main body 12 made of a synthetic resin, etc. plural pockets 7, 7 that freely rotatably hold balls 5, 5. Examples of synthetic resins to be used include polyamide resins, polyacetal resins, phenol resins, polypropylene resins, and polyphenyl sulfide resins. These resins may contain an appropriate amount of a reinforcing agent such as glass fiber. Each pocket 7, 7 is composed of side surfaces of a pair of elastic pieces 13, 13 arranged in main body 12 with intervals, and a spherically formed, depressed part 14, 14 arranged between the pair of elastic pieces 13, 13 and in the side surface (right-hand side in FIG. 2) extending along the axial direction (left-right direction in FIG. 2) of main body 12. The radii of curvature of the side surface of elastic piece 13, 13 and depressed part 14, 14 are slightly larger than the radius of the curvature of the rolling surface of ball 5.

In either case of using cage 6, 11, the space present between the outer periphery of inner ring 2 and the inner periphery of outer ring 4 is filled with a grease to promote a smooth relative revolution of inner ring 2 and outer ring 4. With such a measure, the rolling bearing is prevented from vibration or noise generation as well as seizure. Therefore, on the both side inner peripheries of outer ring 4, sealing plates (not shown in the figure) such as seal or shield of circular ring form are provided to close the both ends of the above-described space. These sealing plates act to prevent the leakage of the lubricant from the space and the intrusion of foreign matters such as dust into the space. The surfaces of inner ring 2, outer ring 4, balls 5, 5 and cage 6, 11 are coated with a thin lubricant film for the purposes of rust prevention and life expansion of the metallic parts.

In these rolling bearings, the radii of curvature of the cross-sectional shape of inner raceway 1 and outer raceway 3 are made equal to 51.0% to smaller than 60.0% of the diameter of ball 5. By restricting the dimensions in such a range, the reduction of bearing torque results from a synergetic effect of the torque-reducing effect exerted by the grease containing a thickener comprising a long-fiber material and a base oil comprising a polar group-containing lubricant and a non-polar lubricant, and the differential sliding reducing effect due to a small Hertian contact ellipse obtained by a reduced elastic deformation at the contact point of inner raceway 1 or outer raceway 3 with the rolling surface of ball 5. At the same time, fretting damages (abrasion) that might occur in inner raceway 1 and outer raceway 3 due to the impact load repetitively applied during transportation are effectively suppressed, leading to desirable acoustic durability. In contrast, in cases where the radii of curvature of the cross-sectional shape of inner raceway 1 and outer raceway 3 are made equal to 60.0% or more of the diameter of ball 5, the maximum Hertian contact pressure at the contact ellipse part becomes too large, and causes the rolling fatigue life of inner raceway 1 and outer raceway 3 to shorten, deteriorating the acoustic property and the flaking life.

A preferable range of the radii of curvature of the cross-sectional shape of inner raceway 1 and outer raceway 3 is from 51.5% to 58.0% of the diameter of ball 5. Further, the radius of curvature of the cross-sectional shape of inner raceway 1 is preferably from 50.5% to 56.0% of the diameter of ball 5 while the radius of curvature of the cross-sectional shape of outer raceway 3 is preferably from 53.0% to 58.0% of the diameter of ball 5. Still further, by making the radius of curvature of the cross-sectional shape of outer raceway 3 larger than the radius of curvature of the cross-sectional shape of inner raceway 1, not only the contact surface pressure between the rolling surface of ball 5 and the inner raceway becomes small, but also preferably approaches to the contact surface pressure between the rolling surface of ball 5 and the outer raceway 3.

In particular, it is preferred to make the radius of curvature of the cross-sectional shape of inner raceway 1 equal to 51.0% to 56% of the diameter of ball 5, and also the radius of curvature of the cross-sectional shape of outer raceway 3 equal to 52.5% to 58% of the diameter of ball 5 whereby the reduction of bearing torque and fretting damages (abrasion) and the improvement of acoustic durability are further enhanced. Here again, it is desirable to make the radius of curvature of the cross-sectional shape of outer raceway 3 larger than the radius of curvature of the cross-sectional shape of inner raceway 1.

The base oil composing the grease composition for use in the rolling bearing of the invention comprises a mixture of a polar group-containing lubricant and a non-polar lubricant. As the polar group-containing lubricant, those having an ester group or those having an ether group are preferred.

Ester group-containing lubricants are not restricted in particular, but include diester oils obtained by the reaction of a dibasic acid with a branched alcohol, carbonate ester oils, aromatic ester oils obtained by the reaction of a tribasic aromatic acid with a branched alcohol, and polyol ester oils obtained by the reaction of a monobasic acid with a polyhydric alcohol. These oils may be used individually or in combination thereof. In the following, specific examples of each compound type are shown.

Examples of diester oils include dioctyl adipate (DOA), diisobutyl adipate (DIBA), dibutyl adipate (DBA), dibutyl sebacate (DBS), dioctyl sebacate (DOS) and methylacetyl ricinoleate (MAR-N).

Examples of aromatic ester oils include trioctyl trimelitate (TOTM), tridecyl trimelitate (TDTM) and tetraoctyl pyromelitate (TOPM).

Examples of polyol ester oils include the reaction product of a polyhydric alcohol with a monobasic acid as described below. The monobasic acid to be reacted with a polyhydric alcohol may comprise a single compound or mixtures of plural compounds. Further, complex esters comprising an oligo-ester obtained from a polyhydric alcohol and the mixture of a dibasic acid and a monobasic acid may be used. Such a polyhydric alcohol includes trimethylolpropane (TMP), pentaerythritol (PE), dipentaerythritol (DPE), neopentyl glycol (NPG) and 2-methyl-2-propyl-1,3-propanediol (MPPD). As such a monobasic acid, a mono-valent fatty acid with 4 to 16 carbon atoms are mainly used, specifically including lactic acid, valeric acid, caproic acid, caprylic acid, enanthic acid, pelargonic acid, capric acid, undecanoic acid, lauric acid, myristic acid, palmitic acid, beef tallow fatty acid, stearic acid, caproleic acid, palmitoleic acid, petroselinic acid, oleic acid, elaidic acid, asclepinic acid, vaccenic acid, sorbic acid, linoleic acid, linolenic acid, sabinic acid, and ricinolic acid.

Carbonic acid ester oils include those containing linear or branched-chain alkyl groups with 6 to 30 carbon atoms.

Lubricants containing an ether structure include, for example, (di)alkyldiphenyl ether oils, (di)alkyl polyphenyl ether oils and poly(alkylene glycol) oils.

These polar group-containing lubricants may be used individually or in combination of plural compounds. From the viewpoint of torque characteristics as well as acoustic durability, polyol ester oils and aromatic ester oils are particularly preferred.

On the other hand, non-polar lubricants include mineral oils, synthetic hydrocarbon oils, and mixtures thereof. Specific examples of the mineral oil include paraffinic ones and naphthenic ones. Specific examples of synthetic hydrocarbon oils include poly-α-olefinic oils. Considering acoustic durability, one may preferably use synthetic hydrocarbon oils.

The polar group-containing lubricant and the non-polar lubricants are mixed together in such a manner that the polar group-containing lubricant occupies 5 to 70% by mass, more preferably 10 to 70% by mass of the total amount of the base oil. With contents below 5% by mass of the polar group-containing lubricant, no sufficient effect is obtained for the improvement of acoustic durability and torque reduction. The grease composition used for the rolling bearing of the invention can be prepared by first synthesizing a metallic soap-based thickener containing a long-fiber material in a non-polar lubricant, which is dissolved and thereafter converted to a gel, and mixing the gel with a polar group-containing lubricant. Accordingly, when the content of the polar group-containing lubricant exceeds 70% by mass, the quantity of the non-polar lubricant becomes excessively small and this adversely affects the synthesis of the long-fiber metallic soap-based thickener. The numeral expressed with the unit "% by mass" as used herein is the almost the same as the numeral expressed with the unit "% by weight".

Although the kinematic viscosity of the base oil comprising a polar group-containing lubricant and a non-polar lubricant may be in the conventionally known range of from 10 mm$^2$/s (at 40° C.) to 500 mm$^2$/s (at 40° C.), the base oil preferably contains a high-viscosity polar group-containing lubricant with a viscosity of 2,000 mm$^2$/s (at 40° C.) to 100,000 mm$^2$/s (at 40° C.) as the polar group-containing lubricant. To improve fretting characteristics, the higher kinematic viscosity of the base oil, the better within the range of not giving an adverse effect on the torque property, since the torque can be reduced due to the presence of the long-fiber material as a thickener. Specifically, the kinematic viscosity of the base oil preferably is in the range of from 25 mm$^2$/s (at 40° C.) to 500 mm$^2$/s (at 40° C.), particularly from 50 mm$^2$/s (at 40° C.) to 500 mm$^2$/s (at 40° C.).

Further, the combination of a low-viscosity polar group-containing lubricant having a kinematic viscosity at 40° C. of from 10 mm$^2$/s to smaller than 150 mm$^2$/s, a polar group-containing lubricant having a kinematic viscosity at 40° C. of from 150 mm$^2$/s to smaller than 2,000 mm$^2$/s, and a high-viscosity polar group-containing lubricant having a kinematic viscosity at 40° C. of from 2,000 to 100,000 mm$^2$/s in appropriate mixing ratios are preferred. In particular, it is preferred to use the mixture of three kinds of polar group-containing lubricants, i.e., a low-viscosity polar group-containing lubricant, a medium-viscosity polar group-containing lubricant and a high-viscosity polar group-containing lubricant whereby the content of the high-viscosity polar group-containing lubricant is preferably from 5 to 30% by mass of the total amount of the base oil. Here, the low-viscosity polar group-containing lubricant is preferably selected from polyol ester oils, diester oils and ether oils.

The thickener in the grease composition used for the rolling bearing of the invention is a metallic soap-based thickener containing a long-fiber material having a major axis part of 3 μm or longer. As the metallic soap, the metal salt of an organic fatty acid or the metal salt of an organic hydroxyl fatty acid obtained by the reaction of a mono- and/or di-valent organic fatty acid or organic hydroxyl fatty acid with a metal hydroxide. The organic fatty acid used for the synthesis of the metallic soap, which has no special limitation, includes lauric acid ($C_{12}$), myristic acid ($C_{14}$), palmitic acid ($C_{16}$), marganic acid ($C_{17}$), stearic acid ($C_{18}$), arachidic acid ($C_{20}$), behenic acid ($C_{22}$), lignoceric acid ($C_{24}$) and beef tallow fatty acid. Examples of organic hydroxyl fatty acids include 9-hydroxystearic acid, 10-hydroxystearic acid, 12-hydroxystearic acid, 9,10-dihydroxystearic acid, ricinolic acid and ricinoelaidic acid. On the other hand, examples of metal hydroxides include the hydroxide of aluminum, barium, calcium, lithium or sodium.

The way how to combine the organic fatty acid or organic hydroxyl fatty acid with the metal hydroxide has no special limitation, but the combinations of stearic acid, beef tallow fatty acid or hydroxystearic acid (particularly 12-hydroxystearic acid) with lithium hydroxide are preferred because of the excellent bearing property. If required and necessary, plural metallic soaps can be used together.

To obtain a grease composition comprising a metallic soap-based thickener containing a long-fiber material, the organic fatty acids or organic hydroxyl fatty acids is reacted with a metal hydroxide in a non-polar lubricant that is a component for the base oil, and the resulting reaction product is mixed with a polar group-containing lubricant. There is no restriction on the reaction condition. The following process is an example of the preparation method.

First of all, hydroxystearic acid is dissolved in a synthetic hydrocarbon oil (non-polar lubricant), and reacted with lithium hydroxide to form a lithium soap. By heating the resulting mixture to at least 210° C., the lithium soap is dissolved in a polar group-containing lubricant. After kept at 200° C. for about 60 min, the mixture is slowly cooled to 140° C. at a cooling rate of 1° C. per min. When the temperature becomes below 140° C., the additive amount of the base oil (i.e., the synthetic hydrocarbon oil+the polar group-containing lubricant) heated at 140° C. is added. The resulting product is fed to a three-roll mill to prepare the targeted grease containing a long-fiber lithium soap.

The content of the thickener is in the range of from 5 to 20% by mass similar to those for conventional grease compositions. Amounts of an organic fatty acid or hydroxyl fatty acid and a metal hydroxide are appropriately selected.

The long-fiber metallic soap-based thickener contained in the grease composition preferably occupies 30% by mass or more of the total amount of thickener. Below 30% by mass, the bearing torque is not sufficiently reduced. In cases where the major axis part of the long-fiber metallic soap-based thickener is too large, the long-fiber metallic scope-based thickener entering the contact surface of the rotating rolling bearing causes an excessively intense vibration, and deteriorates the initial noise characteristics. Accordingly, the upper limit of the major axis part of the long-fiber metallic soap-based thickener is not preferably 10 μm. Although the major axis part is not particularly limited, the length thereof is smaller than 1 μm. The dimensions of the major and minor axis parts of the long-fiber metal soap-based thickener can be controlled by appropriately selecting the above-described reaction conditions.

Figure 3A:
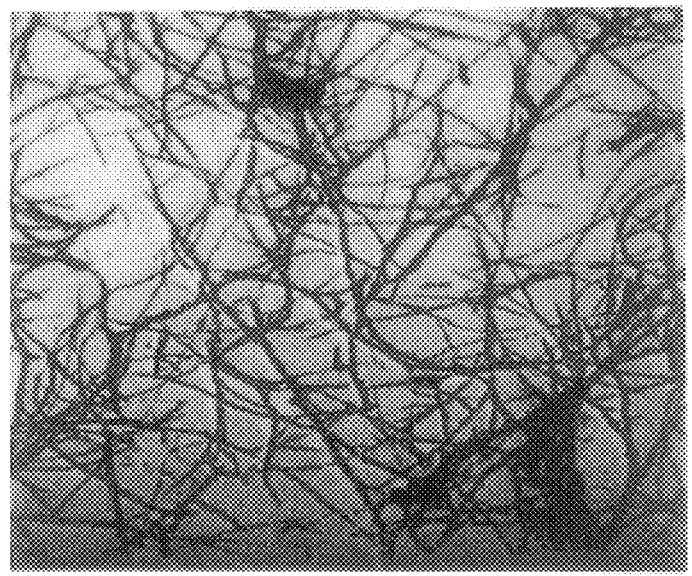
FIG. 3A is an electron micrograph of the grease composition prepared in Example 1.

The major and minor axis parts of the metallic soap-based thickener in the grease composition synthesized according to the above-described method can be measured by dispersing and diluting the grease composition with a solvent such as hexane, depositing the dispersed phase on a cupper mesh coated with a collodion film, and observing the sample thus prepared with a transmission electron microscope at a magnification on the order of 6,000 to 20,000 times. FIG. 3A is an example of an electron micrograph (the grease composition in Example 1). The figure shows that a long-fiber material with a major axis part of 3 μm or more is produced.

The grease composition preferably contains, in addition to the base oil and the thickener, a carboxylic acid or a carboxylic acid salt. The added carboxylic acid or carboxylic acid salt forms an adsorption film to improve surface frictional property, and thus further enhances the bearing torque-reducing effect, which leads to the improvement of acoustic durability. As such carboxylic acid, oleic acid, naphthenic acid and succinic acid are included. As succinic acid compounds, an alkenylsuccinic acid is preferred. As succinic acid derivatives, ester of an alkylsuccinic acid and ether of an alkylsuccinic acid, and ester of an alkenylsuccinic acid and ether of an alkenylsuccinic acid are included. The content thereof is preferably up to 10% by mass of the total amount of the grease composition.

The grease composition can contain an anti-oxidant, a rust preventive, a metal deactivator, an oilness agent, an extreme pressure agent, a wear inhibitor and a viscosity index improver within the range not deteriorating the prominent properties of the grease composition. Each additive may be used individually or in combination of two or more thereof. As such additives, those well-known in the art may be used including, for example, amine-, phenol- or sulfur-based compounds and zinc dithiophosphate as the anti-oxidant; petroleum sulfonate, dinonyl naphthalenesulfonate and sorbitan ester as the rust preventive; benzotriazole and sodium nitrite as the metal deactivator; a fatty acid and vegetable oils as the oilness agent; and polymethacrylate, polyisobutylene and polystyrene as the viscosity index improver. The content of these additives, each of which may be used individually or in combination of two or more thereof, is preferably in total up to 20% by mass of the total amount of the grease composition.

The worked penetration of the grease composition is preferably 250 to 330. In other words, low torque can be achieved by shifting the penetration to a comparatively higher value side from the conventional range of NLGI No. 2 to No. 3. However, with too large penetration values, the grease becomes too softened. Hence the range of 250 to 330 is desirable.

The rolling bearing thus constructed exhibits a particularly excellent low torque, acoustic characteristic and anti-fretting property when it has an internal space in the bearing itself. In general, the differential sliding caused by the radial difference of each contact ellipse between the inner raceway and the outer raceway and the rolling element, and the spin sliding occurring in the state where there exists a contact angle under the application of an axial load affects the torque and acoustic characteristics of the rolling bearing. The torque increase due to the spin sliding inevitably takes place when a rolling bearing having an internal space therein operates subjecting to a pre-loading in the axial direction or an external axial loading with the presence of a contact angle. Accordingly, the invention is particularly effective when applied to a rolling bearing having an internal clearance therein.

The invention will be explained in more detail with reference to some Examples and Comparative Examples, not to restrict the invention to those Examples.

EXAMPLES 1 TO 11 AND COMPARATIVE EXAMPLES 1 TO 5

In Tables 1, 2 and 3, the grease compositions and their properties are shown. The total amount of the base oil and the lithium soap was made 950 g, to which 50 g in total of various additives (a carboxylic acid, an anti-oxidant, a rust preventive and a metal deactivator) was added to make 1,000 g of the greasing composition. In the table, the kinematic viscosity of the base oil (a mixture of a polar group-containing lubricant and a non-polar lubricant) at 40° C. was described together. Each grease composition was prepared as follows. First, hydroxystearic acid was dissolved in the non-polar lubricant described in the tables, and reacted with lithium hydroxide to form a lithium soap. By heating the resulting mixture to above 210° C., the mixture was dissolved into the polar group-containing lubricant described in the tables. After kept at 200° C. for about 60 min, the mixture was slowly cooled to 140° C. at a cooling rate of 1° C. per min. When the temperature became up to 140° C., the additive amount of the base oil (i.e., the synthetic hydrocarbon oil+the polar group-containing lubricant) heated at 140° C. was added. The resulting product was fed to a three-roll mill to prepare the grease composition.

Figure 3B:
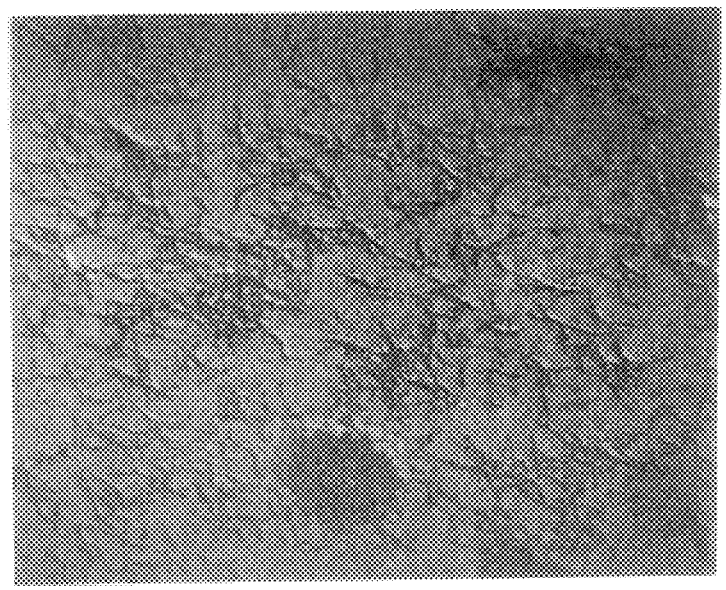
FIG. 3B is an electron micrograph of the grease composition prepared for Example 5.

Each of the grease compositions in Example 1 and Comparative Example 5 was dispersed in and diluted with hexane, and the diluted product was deposited on a collodion film-coated cupper mesh. The sample thus prepared was observed with a transmission electron microscope at a magnification of 6,000 times. FIG. 3A is an electron micrograph obtained with the grease composition in Example 1, and FIG. 3B is one obtained with the grease composition in Comparative Example 5. The figures show that the grease composition in Example 1 contains lithium soap with a major axis part not shorter than 3 $\mu$m.

Each grease composition was applied to each of the bearings to be tested as shown below, and was subjected to the following measurements and tests: (1) Bearing dynamic torque test, (2) Bearing cage noise measurement, (3) Fretting test and (4) Bearing acoustic durability test.

The ratios of the radii of curvature of the cross-sectional shape of the inner raceway and the outer raceway in the bearing to be tested to the ball diameter (this ratio being called Groove R hereinafter) are as follow.

Example 1: Groove R for an inner raceway=51.75%, Groove R for an outer raceway=53.0%
Example 2: Groove R for an inner raceway=51.0%, Groove R for an outer raceway=53.0%
Example 3: Groove R for an inner raceway=52.5%, Groove R for an outer raceway=54.5%
Example 4: Groove R for an inner raceway=53.0%, Groove R for an outer raceway=55.0%
Example 5: Groove R for an inner raceway=56.0%, Groove R for an outer raceway=58.0%
Example 6: Groove R for an inner raceway=51.0%, Groove R for an outer raceway=51.0%
Example 7: Groove R for an inner raceway=59.0%, Groove R for an outer raceway=59.75%
Examples 8 to 11 (which are the same as one another): Groove R for an inner raceway=51.0%, Groove R for an outer raceway=53.0%
Comparative Examples 1 to 5 (which are the same as one another): Groove R for an inner raceway=52.0%, Groove R for an outer raceway=52.0%

(1) Dynamic Torque Test of Bearing

Figure 4:
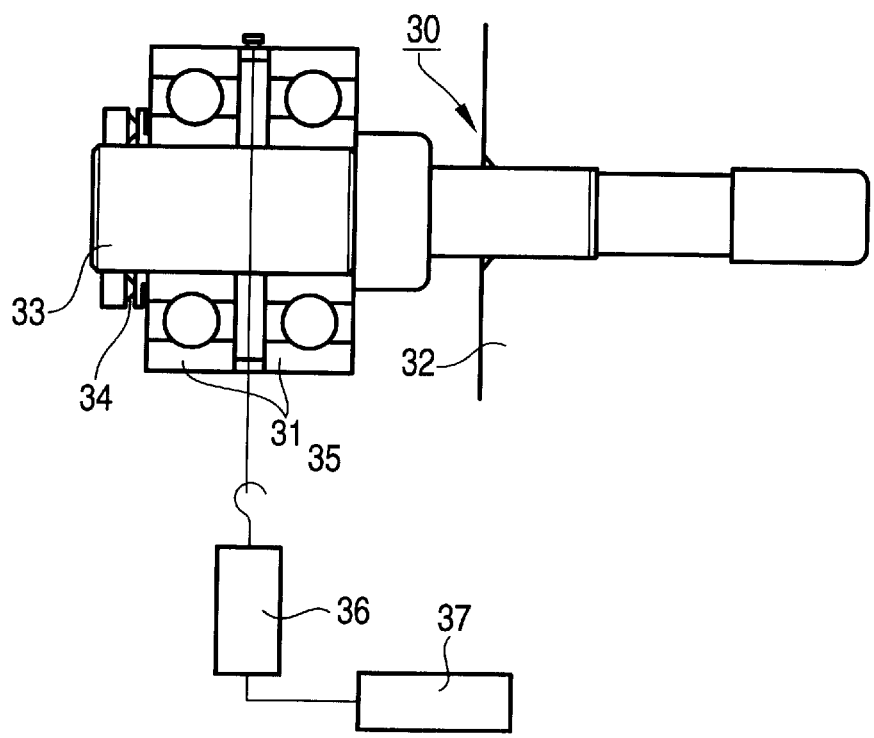
FIG. 4 is a conceptual view of schematically illustrating the measuring apparatus used to perform bearing torque test in the Examples.

With use of a measuring apparatus 30 shown in FIG. 4, bearing dynamic torque was measured. In the measuring apparatus 30, a pair of bearings to be tested 31 is mounted on a shaft 33 connected to an air spindle 32 with a pre-loading wave washer 34. The bearing to be tested 31 is horizontally arranged together with an air spindle 32, and a load-converter 36 is suspended via a string 35. The output of load-converter 36 is recorded with a X-Y recorder 37.

The test was conducted with a rolling bearing equipped with a non-contact rubber seal, the bearing having an iron cage and the inside and outside diameters thereof being 15 mm$\phi$ and 35 mm$\phi$, the width thereof being 11 mm and the internal clearance being 11 to 25 $\mu$m as a bearing to be tested 31, and by packing 0.7 g of each grease composition of Examples 1 to 11 and Comparative Examples 1 to 5 into the bearing. The axial load was set to 39.2 N, and the inner ring was rotated at 1,400 min$^{-1}$ for the measurement of dynamic torque. The results of measurement are shown as dynamic torque in Tables 1 and 2. In Tables 1 to 3, symbol 'x' means that the dynamic torque of the test bearing 31 is 80% or more, symbol '$\Delta$' 60% to smaller than 80%, symbol 'O' 40% to smaller than 60% and symbol '⊙' smaller than 40% for the reference value (100%) of that of the bearing packed with a conventional grease composition used in the motors for conventional air-conditioners, respectively. In the present bearing torque test, the level of 'O', that is, smaller than 60% for the reference value, was judged acceptable. Tables 1 to 3 show that Examples 1 to 11 achieve preferable torque characteristics.

Separately, with use of a bearing in which the groove R for the inner raceway is 52.0% and the groove R for the outer raceway is 52.0%, the compounding ratio of the polar group-containing lubricant in the grease composition, the kinematic viscosity of the base oil and the compounding ratio of the long-fiber material in the thickener were examined by measuring dynamic bearing torque.

(1-1 Verification of the Compounding Ratio of the Polar Group-Containing Lubricant)

Figure 5:
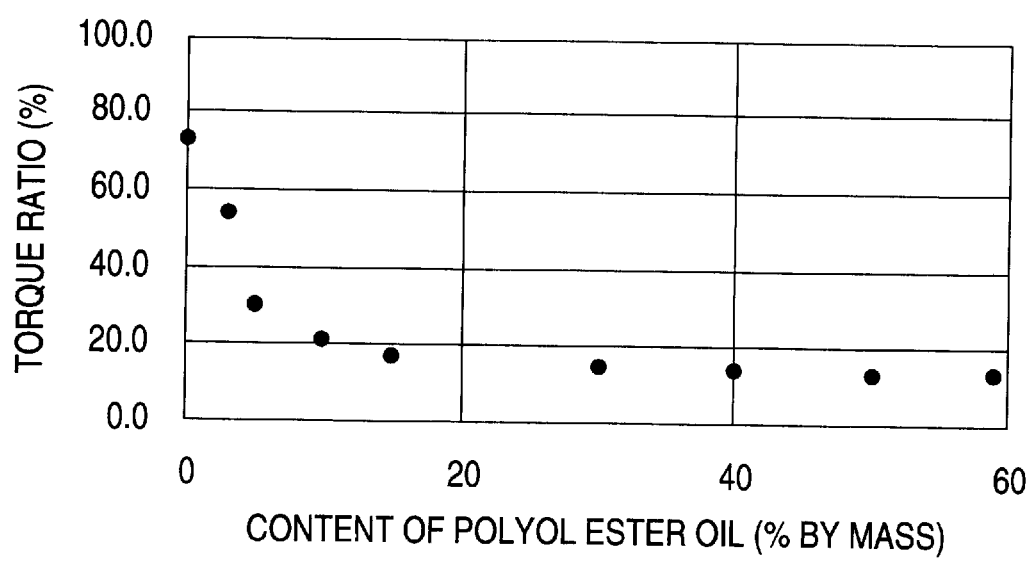
FIG. 5 is a graph showing the relationship between the mixed ratio of a polar group-containing lubricant and bearing torque, obtained by the Examples.

According to Example 2, a series of grease compositions with varying compounding ratios of the polyol ester were prepared, and similar measurements of dynamic bearing torque were conducted. The torque was measured 5 min after the start of rotation. The results are shown in FIG. 5, which indicates that compounding ratios of the polyol ester of at least 5% by mass, particularly at least 10% by mass are effective to obtain an excellent torque property.

(1-2 Verification of the Kinematic Viscosity of the Base Oil)

Figure 6:
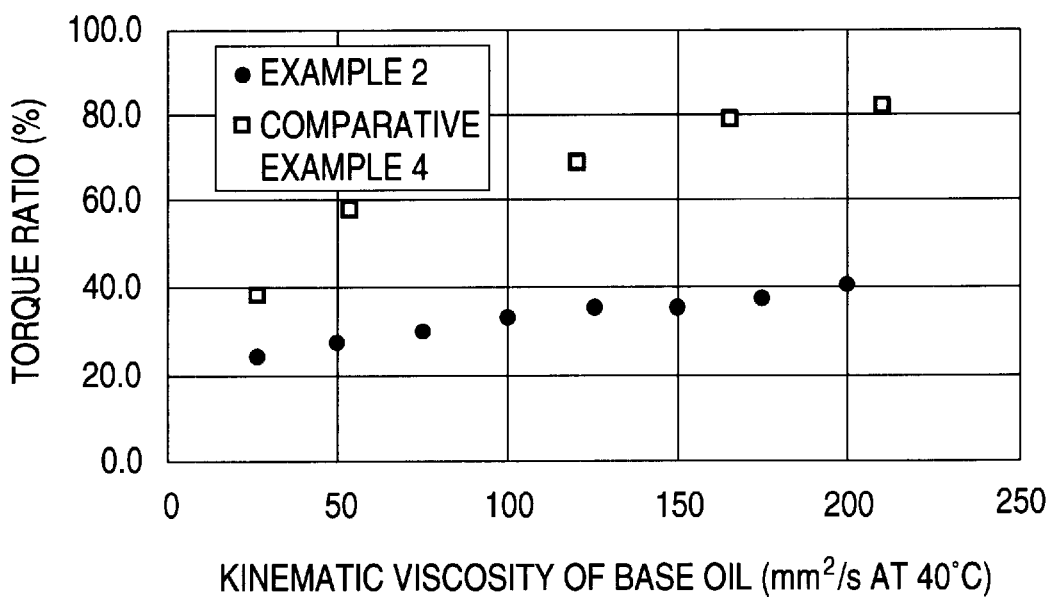
FIG. 6 is a graph showing the relationship between the kinematic viscosity of a base oil and bearing torque, obtained by the Examples.

According to Example 2 and Comparative Example 4, grease compositions with varying kinematic viscosities of the base oil were prepared, and similar measurements of bearing dynamic torque were conducted. The torque was measured 5 min after the start of rotation. The results are shown in FIG. 6, which indicates that, with the bearings to be tested charged with the grease composition of Example 2, the bearing torque is always low over the entire tested range (25 to 200 mm$^2$/s at 40° C.) of the kinematic viscosity of the base oil, thus achieving an excellent torque property.

In particular, with kinematic viscosities of at least 50 mm²/s at 40° C., the difference of Example 2 from Comparative Example 4 becomes remarkable.

(1-3 Verification of the Compounding Ratio of the Long-fiber Material in the Thickener)

Figure 7:
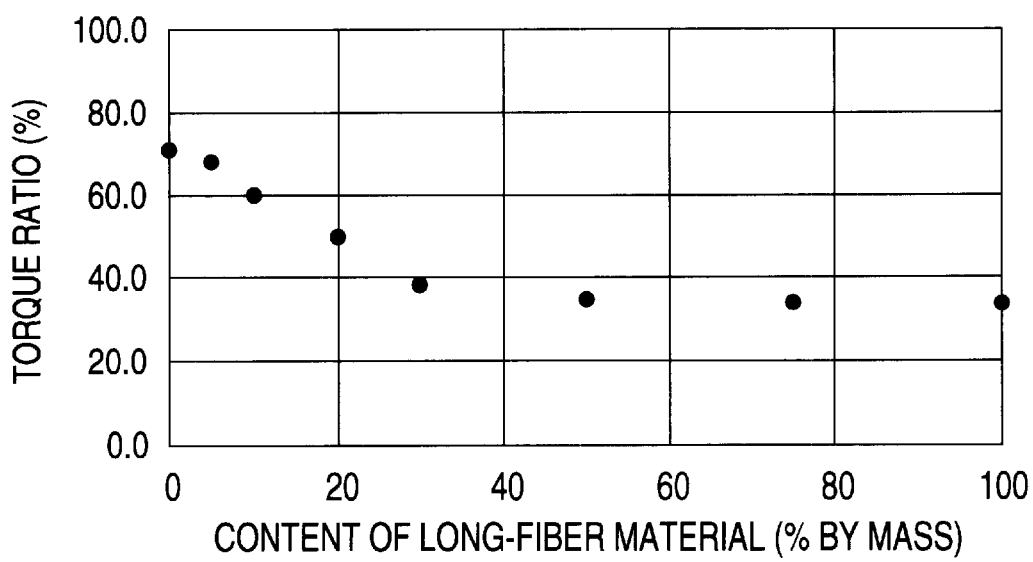
FIG. 7 is a graph showing the relationship between the mixing ratio of the thickener and the bearing torque, obtained by the Examples.

According to Example 2, grease compositions were prepared by changing the compounding ratio of the long-fiber lithium soap, and similar measurements of bearing dynamic torque were conducted. The torque was measured 5 min after the start of rotation. The results are shown in FIG. 7, which indicates that 30% by mass or more of the compounding ratio of the long-fiber material is effective to sufficiently suppress bearing torque.

(1-4 Verification of the Effect of the Radius of Curvature of the Cross-Sectional Shape of the Inner Raceway)

Figure 8:
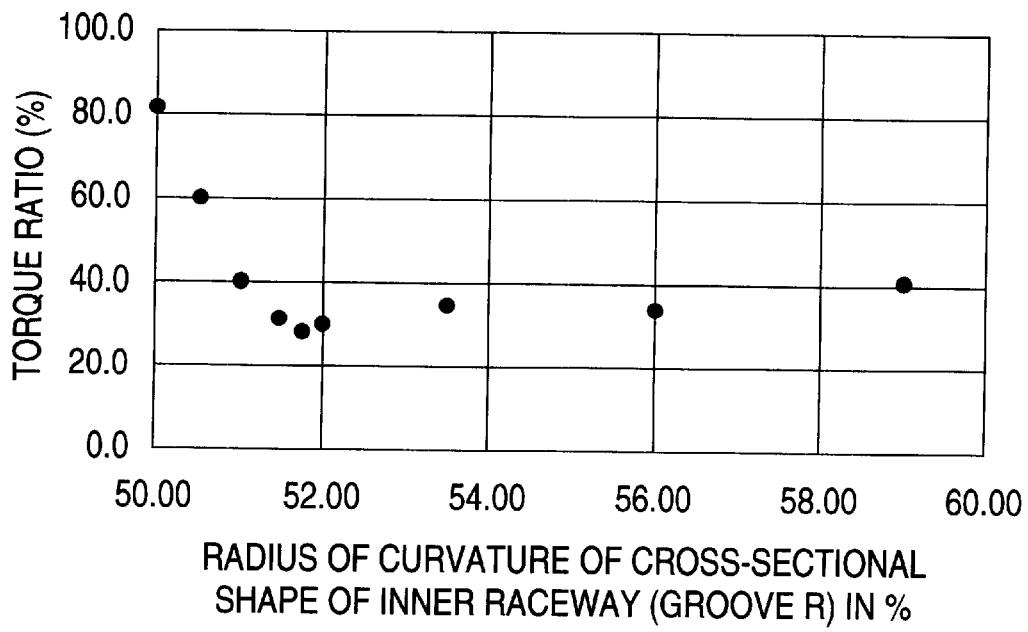
FIG. 8 is a graph showing the relationship between the ratio of the radius of curvature of the cross-sectional shape of the inner raceway to the ball diameter and bearing torque, obtained by the Examples.

With a bearing to be tested in which the radius of curvature of the cross-sectional shape of the outer raceway is fixed to 53.0% of the ball diameter with varying radii of curvature of the cross-sectional shape of the inner raceway and in which the grease composition of Example 2 is packed, similar measurements of bearing dynamic torque were conducted. The torque was measured 5 min after the start of rotation. The results are shown in FIG. 8, which indicates that, when the radius of curvature of the cross-sectional shape of the inner raceway is 51.0% or more of the ball diameter, the bearing dynamic torque can be suppressed to a sufficiently low value. Particularly preferable radii of curvature are between 51.5 and 58.0% where the torque ratio is less than 40%.

In the table, when the radius of curvature of the cross-sectional shape of the inner raceway is 50.5% of the ball diameter, the torque ratio is slightly smaller than 60% of the reference as 'O'. That is, the radius of curvature of the cross-sectional shape of the outer raceway is 53.0% of the ball diameter. This fact resulted from effective suppression of dynamic torque by the combination of the radius of curvature of the cross-sectional shape of the inner raceway and the radius of curvature of the cross-sectional shape of the outer raceway. In other words, even when the radius of curvature of the cross-sectional shape of the inner raceway and the radius of curvature of the cross-sectional shape of the outer raceway fall outside the range of 51.0% to smaller than 60% of the ball diameter, a desirable low torque is achieved with a radius of curvature of the cross-sectional shape of the inner raceway not smaller than 50.5% of the ball diameter combined with a radius of curvature of the cross-sectional shape of the outer raceway not smaller than 53.0% of the ball diameter. Bearing torque is affected by the contact areas between the inner ring and the rolling element and between the outer ring and the rolling element, and the slip during the contact. Usually, bearing torque tends to increase with smaller radius of curvature of the cross-sectional shape of the inner raceway and smaller radius of curvature of the cross-sectional shape of the outer raceway since the contact area with the rolling element increases. The invention can decrease bearing torque by taking the size of the radius of curvature of the cross-sectional shape of the inner raceway or the radius of curvature of the cross-sectional shape of the outer raceway into consideration.

(2) Measurement of Bearing Cage Noise

The test was conducted with a bearing equipped with a non-contact rubber seal, the bearing having a pressed cage and the inside and outside diameters thereof being 15 mmφ and 35 mmφ, the width thereof being 11 mm and the internal clearance being 11 to 25 μm as a test bearing 31, and by packing 0.7 g of each grease composition of Examples 1 to 11 and Comparative Examples 1 to 5 to the bearing. The axial load was set to 39.2 N, and the inner ring was rotated at 1,400 min$^{-1}$. The cage noise was measured with a frequency analyzer at 0° C. and +20° C. The results are shown as cage noise in Tables 1, 2 and 3. In Tables 1 and 2, symbol 'O' means no noise generation, symbol 'Δ' slight noise generation, and symbol 'x' large noise generation, respectively. Tables 1 and 2 show that in Examples 1 to 11 no noise generates.

(3) Fretting Test

Figure 9:
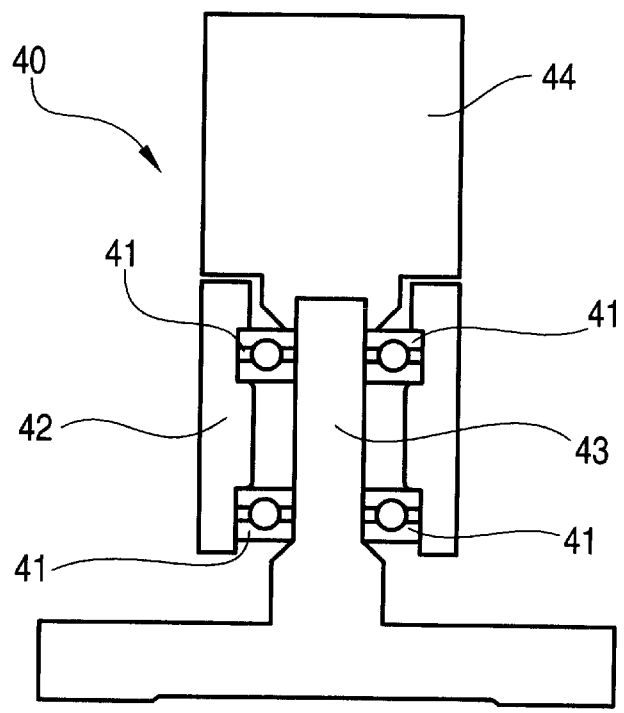
FIG. 9 is a conceptual view of schematically illustrating the measuring apparatus used for the fretting test in the Examples.

Fretting tests were made with a measuring apparatus 40 shown in FIG. 9. In measuring apparatus 40, the bearing to be tested 41 is equipped via an outer ring housing 42 and a shaft 43. With use of a vibrator 44, repeated loads were applied to bearing to be tested 41 at the frequency of 50 Hz. The test was conducted with a rolling bearing equipped with a non-contact rubber seal, the bearing having an iron cage and the inside and outside diameters thereof being 15 mmφ and 35 mmφ, the width thereof being 11 mm and the internal clearance being 11 to 25 μm as a bearing to be tested 41, and by packing 0.7 g of each grease composition of Examples 1 to 11 and Comparative Examples 1 to 5 to the rolling bearing. With axial loads varied from 20 to 1,500 N, 5×10$^5$ cycles were applied as a fretting test. With the following evaluation criteria, the acoustic characteristics of bearing to be tested 41 after the fretting test were measured.

The acoustic characteristics of the bearing were measured with an Anderon meter in terms of the increment of Anderon value obtained by the comparison of the bearing Anderon value immediately after the packing of each grease composition with that after the fretting test of the 5×10$^5$ cycle applications. In addition, each bearing subjected to the fretting test was decomposed to observe the abrasion damage state of the bearing raceway surface. Bearings having abrasion damage clearly visible exhibited marked deterioration in acoustic characteristics (large increase in Anderon value), while those having no abrasion damage exhibited no deterioration in acoustic characteristics (no increase in Anderon value). These facts confirm that there is a strong correlation between the abrasion damage state of the bearing raceway surface and the acoustic characteristics.

The results are shown in Tables 1, 2 and 3 as fretting (acoustic characteristics). In Tables 1 and 2, symbol 'X' indicates that the acoustic characteristics of test bearing 41 is 75% or higher relative to the reference value (100%) that corresponds to the acoustic characteristics (increase in Anderon value) of a rolling bearing packed with a grease composition used in conventional motors for air-conditioners. On the same basis, symbol 'Δ' indicates 50% to smaller than 75%, symbol 'O' 25% to smaller than 50%, and symbol '⊚' smaller than 25% of the reference value, respectively. As for the fretting test, the levels of 'O', i.e., those of smaller than 50% of the reference value, were judged acceptable. It is evident from Tables 1 and 2 that desirable fretting characteristics can be achieved with the grease compositions used in Examples 1 to 11.

(4) Bearing Acoustic Durability Test

Figure 10:
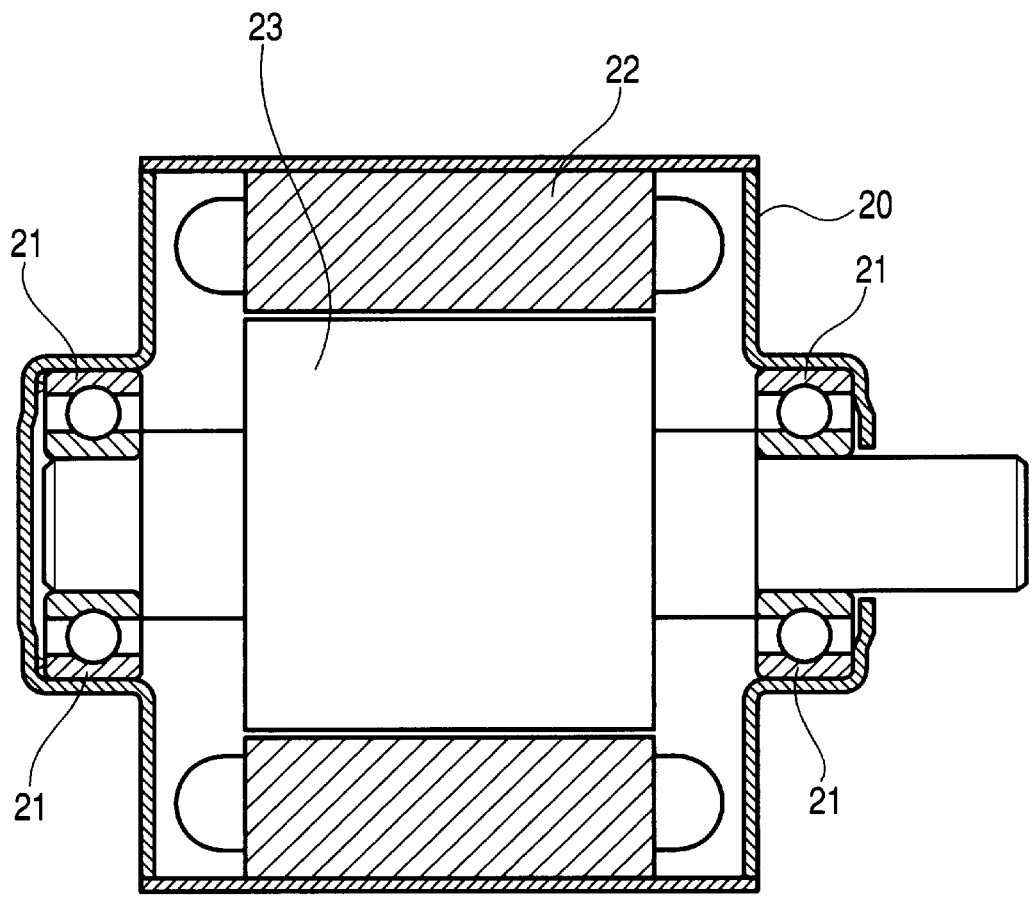
FIG. 10 is a conceptual view of schematically illustrating the measuring apparatus used for acoustic durability test of the bearings in the Examples.

With use of an actual motor durability-testing apparatus shown in FIG. 10, bearing acoustic durability tests were performed. This actual motor durability-testing apparatus rotates a pair of bearings to be tested 21 installed in a housing 20 and coupled to a rotor 23 by the driving force from a DC power source (not shown in the figure) via a coil 22. The measurement was conducted with a rolling bearing equipped with a non-contact metallic seal, the bearing having a synthetic resin cage and the inside and outside diameters thereof being 8 mmφ and 22 mmφ, the width thereof being 7 mm and the internal clearance being 8 to 25

μm respectively, and equipped with groove R of inner raceway and groove R of outer raceway as a bearing to be tested 21. The bearing was packed with 0.16 g of each grease composition of Examples 1 to 11 and Comparative Examples 1 to 5. For each Example and Comparative Example, eight bearings to be tested 21 were produced and installed in the actual motor durability-testing apparatus (with an axial load of about 39.2 N). Then the actual motor durability-testing apparatus was placed in a thermostat kept at 120° C., and the inner ring was rotated at 300 min$^{-1}$ or 5,600 min$^{-1}$ for 1,000 hours. After the 1,000-hour operation, the test bearing 21 was taken off to examine and judge the bearing acoustic characteristics in terms of the following evaluation criteria.

The acoustic characteristics of the bearing were measured with an Anderon meter by comparing the bearing Anderon value immediately after the packing of each grease composition with the bearing Anderon value after the 1,000-hour inner ring rotation. The results of judgment are shown in Tables 1, 2 and 3 as acoustic characteristics. In Tables 1, 2 and 3, symbol 'O' indicates no deterioration of acoustic characteristics, symbol 'Δ' slight deterioration of acoustic characteristics, and symbol 'X' deterioration of acoustic characteristics, respectively. Table 1 shows that all the Examples give satisfactory acoustic characteristics although in Example 7 slight deterioration of acoustic characteristics are observed.

TABLE 1

| Composition · Property | | Example 1 | Example 2 | Example 3 | Example 4 | Example 5 | Example 6 |
|---|---|---|---|---|---|---|---|
| Thickener · Lithium Soap (g) | | 100 | 120 | 100 | 120 | 80 | 90 |
| Base Oil | Poly-α-olefinic Oil (g) | 340 | 498 | 637 | 498 | 348 | 647 |
| | Mineral Oil (g) | | | | | | |
| | Polyol Ester Oil (g) | 510 | 332 | 213 | 166 | 330 | 213 |
| | Alkyl diphenyl Ether Oil (g) | | | | 166 | 192 | |
| Additive | Alkenylsuccinic Acid Ester Oil (g) | 25 | 25 | 15 | | | 5 |
| | Alkylsuccinic Acid Ether Oil (g) | | | | 20 | | 5 |
| | Additional Carboxylic acid (g) | | | | | | |
| | Anti-oxidant, Rust Preventive, Metal Deactivator (g) | 25 | 25 | 35 | 30 | 50 | 35 |
| Kinematic Viscosity of Base Oil (mm$^2$/s, 40° C.) | | 170 | 100 | 50 | 150 | 200 | 50 |
| Worked Penetration | | 280 | 270 | 290 | 270 | 280 | 285 |
| Fiber Structure | | Contains a long-fiber material | | | | | |
| Dynamic Torque | | ⊚ | ⊚ | ⊚ | ⊚ | ⊚ | ○ |
| Cage Noise | 20° C. | ○ | ○ | ○ | ○ | ○ | ○ |
| | 0° C. | ○ | ○ | ○ | ○ | ○ | ○ |
| Fretting (Acoustic Characteristics) | | ⊚ | ⊚ | ⊚ – ○ | ⊚ | ⊚ | ○ |
| Acoustic Characteristics | 300 min$^{-1}$ | ○ | ○ | ○ | ○ | ○ | ○ |
| | 5,600 min$^{-1}$ | ○ | ○ | ○ | ○ | ○ | ○ |

TABLE 2

| Composition · Property | | Example 7 | Example 8 | Example 9 | Example 10 | Example 11 |
|---|---|---|---|---|---|---|
| Thickener · Lithium Soap (g) | | 110 | 120 | 120 | 120 | 120 |
| Base Oil | Poly-α-olefinic Oil (g) | 318 | 498 | 498 | 498 | 498 |
| | Mineral Oil (g) | | | | | |
| | Polyol Ester Oil (g) | 330 | 332 | 332 | 332 | 332 |
| | Alkyl diphenyl Ether Oil (g) | 192 | | | | |
| Additive | Alkenylsuccinic Acid Ester Oil (g) | | | | 5 | 10 |
| | Alkylsuccinic Acid Ether Oil (g) | | | 5 | | 10 |
| | Additional Carboxylic acid (g) | | 25 | 5 | 10 | 10 |
| | Anti-oxidant, Rust Preventive, Metal Deactivator (g) | 50 | 25 | 35 | 30 | 30 |
| Kinematic Viscosity of Base Oil (mm$^2$/s, 40° C.) | | 200 | 100 | 100 | 100 | 100 |
| Worked Penetration | | 285 | 260 | 270 | 270 | 260 |
| Fiber Structure | | Contains a long-fiber material | | | | ⊚ |
| Dynamic Torque | | ○ | ⊚ | ⊚ | ⊚ | ⊚ |
| Cage Noise | 20° C. | ○ | ○ | ○ | ○ | ○ |
| | 0° C. | ○ | ○ | ○ | ○ | ○ |
| Fretting (Acoustic Characteristics) | | ⊚ | ⊚ | ⊚ | ⊚ | ⊚ |
| Acoustic Characteristics | 300 min$^{-1}$ | Δ | ○ | ○ | ○ | ○ |
| | 5,600 min$^{-1}$ | Δ | ○ | ○ | ○ | ○ |

TABLE 3

| Composition · Property | | Comparative example 1 | Comparative example 2 | Comparative example 3 | Comparative example 4 | Comparative example 5 |
|---|---|---|---|---|---|---|
| Thickener | Lithium Soap (g) | 120 | 130 | 100 | 120 | 120 |
| Base Oil | Poly-α-olefinic Oil (g) | | 410 | | 830 | |
| | Mineral Oil (g) | | | 850 | | |
| | Polyol Ester Oil (g) | 830 | 410 | | | 830 |
| | Alkyl diphenyl Ether Oil (g) | | | | | |
| Additive | Alkenylsuccinic Acid Ester Oil (g) | | | | | |
| | Alkylsuccinic Acid Ether Oil (g) | | | | | |
| | Additional Carboxylic acid (g) | | | | | |
| | Anti-oxidant, Rust Preventive, Metal Deactivator (g) | 50 | 50 | 50 | 50 | 50 |
| Kinematic Viscosity of Base Oil (mm²/s, 40° C.) | | 25 | 55 | 130 | 100 | 117 |
| Worked Penetration | | 250 | 245 | 270 | 277 | 276 |
| Fiber Structure | | Contains only a short-fiber material | | Contains a long-fiber material | | Contains only a short-fiber material |
| Dynamic Torque | | ◎ | ○ | Δ | ○ - Δ | X |
| Cage Noise | 20° C. | ○ | ○ | ○ | Δ | Δ |
| | 0° C. | ○ | Δ | Δ | Δ | X |
| Fretting (Acoustic Characteristics) | | X | X | Δ | Δ | Δ |
| Acoustic Characteristics | 300 min⁻¹ | Δ | X | X | Δ | X |
| | 5,600 min⁻¹ | Δ | Δ | Δ | ○ | Δ |

EXAMPLES 12 TO 27 AND COMPARATIVE EXAMPLES 6 TO 10

In conformity with Examples 1 to 11 and Comparative Examples 1 to 5, the grease compositions according to the compositions shown in Tables 4 to 7 were prepared. The kinematic viscosity of poly-α-olefinic oil A used is 33 mm²/s (at 40° C.), the kinematic viscosity of poly-α-olefinic oil B used is 60 mm²/s (at 40° C.), the kinematic viscosity of poly-α-olefinic oil C used is 100 mm²/s (at 40° C.), the kinematic viscosity of mineral oil used is 130 mm²/s (at 40° C.), the kinematic viscosity of diester oil used is 12 mm²/s (at 40° C.), the kinematic viscosity of polyol ester oil A used is 760 mm²/s (at 100° C.), the kinematic viscosity of polyol ester oil B used is 33 mm²/s (at 40° C.), the kinematic viscosity of polyol ester oil C used is 200 mm²/s (at 40° C.), the kinematic viscosity of alkyl diphenyl ether oil A used is 100 mm²/s (at 40° C.), and the kinematic viscosity of alkyl diphenyl ether oil B used is 67 mm²/s (at 40° C.). Also the kinematic viscosity of the base oil (a mixture of a polar group-containing lubricant and a non-polar lubricant) at 40° C. is shown in the tables.

With use of each grease composition, the following measurements and tests were performed: (1) Bearing dynamic torque test, (2) Bearing cage noise measurement, (3) Fretting test and (4) Bearing acoustic durability test. The results are shown in Tables 4 to 7 based on the same evaluation criteria. The groove R of the inner raceway and the groove R of the outer raceway in the bearing to be tested are as follow.

Example 12: Groove R for an inner raceway=51.75%, Groove R for an outer raceway=53.0%
Example 13: Groove R for an inner raceway=51.5%, Groove R for an outer raceway=52.5%
Example 14: Groove R for an inner raceway=53.0%, Groove R for an outer raceway=53.0%
Example 15: Groove R for an inner raceway=53.0%, Groove R for an outer raceway=55.0%
Example 16: Groove R for an inner raceway=56.0%, Groove R for an outer raceway=58.0%
Example 17: Groove R for an inner raceway=50.5%, Groove R for an outer raceway=53.0%
Example 18: Groove R for an inner raceway=59.0%, Groove R for an outer raceway=59.75%
Examples 19 to 22 (which are the same as one another): Groove R for an inner raceway=51.0%, Groove R for an outer raceway=53.0%
Examples 23 to 27 (which are the same as one another): Groove R for an inner raceway=51.7%, Groove R for an outer raceway=53.0%
Comparative Examples 6 to 10 (which are the same as one another): Groove R for an inner raceway=52.0%, Groove R for an outer raceway=52.0%

TABLE 4

| Composition · Property | | Example 12 | Example 13 | Example 14 | Example 15 | Example 16 | Example 17 |
|---|---|---|---|---|---|---|---|
| Thickener | Lithium Soap (g) | 100 | 120 | 100 | 120 | 80 | 90 |
| Base Oil | Poly-α-olefinic Oil A (g) | | | | | | 30 |
| | Poly-α-olefinic Oil B (g) | 340 | 498 | 636 | 498 | 348 | 617 |
| | Poly-α-olefinic Oil C (g) | | | | | | |
| | Mineral Oil (g) | | | | | | |
| | Diester Oil (g) | | | | | | |

TABLE 4-continued

| Composition · Property | | Example 12 | Example 13 | Example 14 | Example 15 | Example 16 | Example 17 |
|---|---|---|---|---|---|---|---|
| | Polyol Ester Oil A (g) | 170 | 42 | 43 | 124 | 235 | 43 |
| | Polyol Ester Oil B (g) | | | 171 | | | 170 |
| | Polyol Ester Oil C (g) | 340 | 290 | | 42 | 95 | |
| | Alkyl diphenyl Ether Oil A (g) | | | | | 166 | |
| | Alkyl diphenyl Ether Oil B (g) | | | | | 192 | |
| Additive | Alkenylsuccinic Acid Ester Oil (g) | 25 | 25 | 15 | | | 5 |
| | Alkylsuccinic Acid Ether Oil (g) | | | | 20 | | 5 |
| | Additional Carboxylic acid (g) | | | | | | |
| | Anti-oxidant, Rust Preventive, Metal Deactivator (g) | 25 | 25 | 35 | 30 | 50 | 35 |
| Kinematic Viscosity of Base Oil (mm²/s, 40° C.) | | 170 | 100 | 50 | 150 | 200 | 50 |
| Worked Penetration | | 280 | 270 | 290 | 270 | 280 | 285 |
| Fiber Structure | | Contains a long-fiber material | | | | | |
| Dynamic Torque | | ◉ | ◉ | ◉ | ◉ | ◉ | ○ |
| Cage Noise | 20° C. | ○ | ○ | ○ | ○ | ○ | ○ |
| | 0° C. | ○ | ○ | ○ | ○ | ○ | ○ |
| Fretting (Acoustic Characteristics) | | ◉ | ◉ | ◉ – ○ | ◉ | ◉ | ○ |
| Acoustic Characteristics | 300 min⁻¹ | ○ | ○ | ○ | ○ | ○ | ○ |
| | 5,600 min⁻¹ | ○ | ○ | ○ | ○ | ○ | ○ |

TABLE 5

| Composition · Property | | Example 18 | Example 19 | Example 20 | Example 21 | Example 22 |
|---|---|---|---|---|---|---|
| Thickener · Lithium Soap (g) | | 110 | 120 | 120 | 120 | 120 |
| Base Oil | Poly-α-olefinic Oil A (g) | | | | | |
| | Poly-α-olefinic Oil B (g) | 318 | 498 | 498 | 498 | 498 |
| | Poly-α-olefinic Oil C (g) | | | | | |
| | Mineral Oil (g) | | | | | |
| | Diester Oil (g) | | | | | |
| | Polyol Ester Oil A (g) | 230 | 42 | 42 | 42 | 42 |
| | Polyol Ester Oil B (g) | | | | | |
| | Polyol Ester Oil C (g) | 100 | 290 | 290 | 290 | 290 |
| | Alkyl diphenyl Ether Oil A (g) | | | | | |
| | Alkyl diphenyl Ether Oil B (g) | 192 | | | | |
| Additive | Alkenyl succinic Acid Ester Oil (g) | | | | 5 | 10 |
| | Alkyl succinic Acid Ether Oil (g) | | | | 5 | 10 |
| | Additional Carboxylic acid (g) | | 25 | 5 | 10 | 10 |
| | Anti-oxidant, Rust Preventive, Metal Deactivator (g) | 50 | 25 | 35 | 30 | 30 |
| Kinematic Viscosity of Base Oil (mm²/s, 40° C.) | | 200 | 100 | 100 | 100 | 100 |
| Worked Penetration | | 285 | 260 | 270 | 270 | 260 |
| Fiber Structure | | Contains a long-fiber material | | | | |
| Dynamic Torque | | ○ | ◉ | ◉ | ◉ | ◉ |
| Cage Noise | 20° C. | ○ | ○ | ○ | ○ | ○ |
| | 0° C. | ○ | ○ | ○ | ○ | ○ |
| Fretting (Acoustic Characteristics) | | ◉ | ◉ | ◉ | ◉ | ◉ |
| Acoustic Characteristics | 300 min⁻¹ | Δ | ○ | ○ | ○ | ○ |
| | 5,600 min⁻¹ | Δ | ○ | ○ | ○ | ○ |

TABLE 6

| Composition · Property | | Example 23 | Example 24 | Example 25 | Example 26 | Example 27 |
|---|---|---|---|---|---|---|
| Thickener · Lithium Soap (g) | | 80 | 100 | 115 | 130 | 80 |
| Base Oil | Poly-α-olefinic Oil A (g) | | 340 | 260 | 620 | |
| | Poly-α-olefinic Oil B (g) | 260 | | | | 348 |
| | Poly-α-olefinic Oil C (g) | | | | | |
| | Mineral Oil (g) | | | | | |
| | Diester Oil (g) | | | 125 | | |
| | Polyol Ester Oil A (g) | 132 | 43 | 50 | 42 | 235 |
| | Polyol Ester Oil B (g) | 218 | 340 | 400 | | |
| | Polyol Ester Oil C (g) | 260 | 127 | | 158 | 95 |
| | Alkyl diphenyl Ether Oil A (g) | | | | | |
| | Alkyl diphenyl Ether Oil B (g) | | | | | 192 |

TABLE 6-continued

| Composition · Property | | Example 23 | Example 24 | Example 25 | Example 26 | Example 27 |
|---|---|---|---|---|---|---|
| Additive | Alkenylsuccinic Acid Ester Oil (g) | | 25 | 15 | | |
| | Alkylsuccinic Acid Ether Oil (g) | | | | 20 | |
| | Additional Carboxylic acid (g) | | | | | |
| | Anti-oxidant, Rust Preventive, Metal Denactivator (g) | 50 | 25 | 35 | 30 | 50 |
| Kinematic Viscosity of Base Oil (mm²/s, 40° C.) | | 115 | 60 | 60 | 80 | 130 |
| Worked Penetration | | 300 | 285 | 270 | 250 | 290 |
| Fiber Structure | | Contains a long-fiber material | | | | |
| Dynamic Torque | | ⊙ | ⊙ | ⊙ | ⊙ | ⊙ |
| Cage Noise | 20° C. | ○ | ○ | ○ | ○ | ○ |
| | 0° C. | ○ | ○ | ○ | ○ | ○ |
| Fretting (Acoustic Characteristics) | | ⊙ | ○ | ○ | ○ | ⊙ |
| Acoustic Characteristics | 300 min⁻¹ | ○ | ○ | ○ | ○ | ○ |
| | 5,600 min⁻¹ | ○ | ○ | ○ | ○ | ○ |

TABLE 7

| Composition · Property | | Compar. Example 6 | Compar. Example 7 | Compar. Example 8 | Compar. Example 9 | Compar. Example 10 |
|---|---|---|---|---|---|---|
| Thickener · Lithium Soap (g) | | 120 | 130 | 100 | 120 | 120 |
| Base Oil | Poly-α-olefinic Oil A (g) | | | | | |
| | Poly-α-olefinic Oil B (g) | | 410 | | | |
| | Poly-α-olefinic Oil C (g) | | | | 830 | |
| | Mineral Oil (g) | | | 850 | | |
| | Diester Oil (g) | 750 | 410 | | | |
| | Polyol Ester Oil A (g) | | | | | 290 |
| | Polyol Ester Oil B (g) | | | | | 540 |
| | Polyol Ester Oil C (g) | 80 | | | | |
| | Alkyl diphenyl Ether Oil A (g) | | | | | |
| | Alkyl diphenyl Ether Oil B (g) | | | | | |
| Additive | Alkenylsuccinic Acid Ester Oil (g) | | | | | |
| | Alkylsuccinic Acid Ether Oil (g) | | | | | |
| | Additional Carboxylic acid (g) | | | | | |
| | Anti-oxidant, Rust Preventive, Metal Deactivator (g) | 50 | 50 | 50 | 50 | 50 |
| Kinematic Viscosity of Base Oil (mm²/s, 40° C.) | | 25 | 55 | 130 | 100 | 117 |
| Worked Penetration | | 250 | 245 | 270 | 277 | 276 |
| Fiber Structure | | Contains only a short-fiber material | Contains only a short-fiber material | Contains a long-fiber material | Contains a long-fiber material | Contains only a short-fiber material |
| Dynamic Torque | | ⊙ | ⊙ | X | ○ – △ | X |
| Cage Noise | 20° C. | ○ | ○ | ○ | △ | △ |
| | 0° C. | ○ | △ | △ | △ | X |
| Fretting (Acoustic Characteristics) | | X | X | △ | △ | △ |
| Acoustic Characteristics | 300 min⁻¹ | △ | X | X | △ | X |
| | 5,600 min⁻¹ | △ | △ | △ | ○ | △ |

As is shown in Tables 4 to 7, all the examples give results superior to the comparative examples.

One can derive the lower limit and the upper limit for the radius of curvature of the cross-sectional shape of the inner raceway and the radius of curvature of the cross-sectional shape of the outer raceway to the ball diameter that achieve level ⊙ for dynamic torque and level O for acoustic characteristics in Examples 1 to 27 as follows: for the inner raceway, the radii of curvature of the cross-sectional shapes are 51.0 to 56.0% of ball diameter, and for the outer raceway, the radii of curvature of the cross-sectional shapes are 52.5 to 58.0%. In particular, with a radius of curvature of the cross-sectional shape of the inner raceway of 50.5 to 56.0% of ball diameter combined with a radius of curvature of the cross-sectional shape of the outer raceway of 53.0 to 58.0% of ball diameter, excellent results are obtained.

Based on such data on the examples and comparative examples, in the present invention, the preferable dimensional relationship among the radii of curvature of the cross-sectional shapes of the inner and outer raceways and the diameter of the rolling element are summarized as shown in FIG. 11. In the figure, area ① indicates the region satisfying either claim 1 or claim 4, area ② indicates the region satisfying either claim 2 or claim 3, area ③ indicates the region for claim 3 and area ④ indicates the region for claim 6. Low torque and acoustic characteristics as well as anti-fretting characteristics become more and more improved in the ascending order of area ①, area ②, area ③ and area ④. Line Y includes the points representing the cases where the radius of curvature of the cross-sectional shape of the inner raceway is the same as the radius of curvature of the cross-sectional shape of the outer raceway. Above this line Y, i.e., where the radius of curvature of the cross-sectional shape of the outer raceway is larger than the radius of curvature of the cross-sectional shape of the inner raceway, the difference in contact area and surface pressure between the inner raceway and the rolling element and between the outer raceway and the rolling element becomes small, thus resulting in improved torque decrease and acoustic characteristics.

As has been explained heretofore, the rolling bearing of the invention not only can reduce bearing torque, but also exhibits outstanding initial (cage) acoustic characteristics at the start of operation under a low temperature atmosphere and further suppresses fretting damages (abrasion) by specifying the dimensional relationship among the radii of curvature of the cross-sectional shape of the inner and outer raceways and the diameter of the rolling element, and packing a grease composition comprising a metallic soap-based thickener containing a long-fiber material with a major axis part length of at least 3 μm.

While the invention has been described in detail and with reference to specific embodiments thereof, it will be apparent to those skilled in the art that various changes and modifications can be made therein without departing from the spirit and scope thereof.

What is claimed is:

1. A rolling bearing comprising an outer ring having on its inner periphery an outer raceway, an inner ring having on its outer periphery an inner raceway, plural rolling elements arranged between said outer raceway and said inner raceway in a freely rotatable manner, a cage holding said plural rotating elements in a freely rotatable condition, and a grease packed in the space between said outer raceway and said inner raceway, said grease comprising a base oil composed of a lubricant having a polar group in its molecular structure and a non-polar lubricant, and a metallic soap-based thickener containing a long-fiber material whose major axis part length is at least 3 μm, and the radius of curvature of the cross-sectional shape of said inner raceway and the radius of curvature of the cross-sectional shape of said outer raceway being in the range of from 51.0% to smaller than 60.0% of the diameter of said rolling element.

2. The rolling bearing as claimed in claim 1, wherein the radius of curvature of the cross-sectional shape of said inner raceway and the radius of curvature of the cross-sectional shape of said outer raceway are from 51.5% to 58.0% of the diameter of said rolling element.

3. The rolling bearing as claimed in claim 1, wherein the radius of curvature of the cross-sectional shape of said inner raceway is from 51.0% to 56.0% of the diameter of said rolling element, and the radius of curvature of the cross-sectional shape of said outer raceway is from 52.5% to 58.0% of the diameter of said rolling element.

4. The rolling bearing as claimed in claim 3, wherein the radius of curvature of the cross-sectional shape of said outer raceway is larger than the radius of curvature of the cross-sectional shape of said inner raceway.

5. The rolling bearing as claimed in claim 1, wherein the radius of curvature of the cross-sectional shape of said outer raceway is larger than the radius of curvature of the cross-sectional shape of said inner raceway.

6. The rolling bearing as claimed in claim 1, wherein the major axis part length of said long-fiber material is up to 10 μm.

7. The rolling bearing as claimed in claim 1, wherein the content of said long-fiber material is 30% by mass or more of the total amount of said metallic soap-based thickener.

8. The rolling bearing as claimed in claim 1, wherein the content of said lubricant containing a polar group is in the range of from 5 to 70% by mass of the total amount of the base oil.

9. The rolling bearing as claimed in claim 1, wherein the kinematic viscosity of said base oil at 40° C. is in the range of from 10 to 500 mm$^2$/s.

10. The rolling bearing as claimed in claim 9, wherein said base oil contains a lubricant containing a polar group with a kinematic viscosity at 40° C. of 2,000 to 100,000 mm$^2$/s.

11. The rolling bearing as claimed in claim 10, wherein said base oil contains a low-viscosity lubricant containing a polar group with a kinematic viscosity at 40° C. of 10 mm$^2$/s to smaller than 150 mm$^2$/s.

12. The rolling bearing as claimed in claim 11, wherein said base oil contains a medium-viscosity lubricant containing a polar group with a kinematic viscosity at 40° C. of 150 mm$^2$/s to smaller than 2,000 mm$^2$/s.

13. The rolling bearing as claimed in claim 11, wherein said low-viscosity lubricant containing a polar group comprises at least one polyol ester oil, a diester oil or an ether oil.

14. The rolling bearing as claimed in claim 10, wherein the content of said lubricant containing a polar group with a kinematic viscosity at 40° C. of 2,000 to 100,000 mm$^2$/s in said base oil is 5 to 30% by mass of the total amount of said base oil.

15. The rolling bearing as claimed in claim 1, wherein said metallic soap is a metal salt of an organic fatty acid or a metal salt of an organic hydroxyl fatty acid.

16. The rolling bearing as claimed in claim 1, wherein the worked penetration of said grease composition is 250 to 330.

17. The rolling bearing as claimed in claim 1 which has an internal clearance in the bearing itself, and is used at least under the application of an axial load with a contact angle other than 0°.

18. A rolling bearing comprising an outer ring having on its inner periphery an outer raceway, an inner ring having on its outer periphery an inner raceway, plural rolling elements arranged between said outer raceway and said inner raceway in a freely rotatable manner, a cage holding said plural rolling elements in a freely rotatable condition, and a grease packed in the space between said outer raceway and said inner raceway, said grease comprising a base oil composed of a lubricant having a polar group in its molecular structure and a non-polar lubricant, and a metallic soap-based thickener containing a long-fiber material whose major axis part length is at least 3 μm, and the radius of curvature of the cross-sectional shape of said inner raceway being in the range of from 50.5% to 56.0% of the diameter of said rolling element, and the radius of curvature of the cross-sectional shape of said outer raceway being in the range of from 53.0% to 58.0% of the diameter of said rolling element.

19. The rolling bearing as claimed in claim 18, wherein the kinematic viscosity of said base oil at 40° C. is 10 to 500 mm$^2$/s.

20. The rolling bearing as claimed in claim 19 which contains a lubricant containing a polar group with a kinematic viscosity at 40° C. of 2,000 to 100,000 mm$^2$/s.

21. The rolling bearing as claimed in claim 20 which contains a low-viscosity lubricant containing a polar group with a kinematic viscosity at 40° C. of 10 mm$^2$/s to smaller than 150 mm$^2$/s.

22. The rolling bearing as claimed in claim 21 which contains a medium-viscosity lubricant containing a polar group with a kinematic viscosity at 40° C. of 150 mm$^2$/s to smaller than 2,000 mm$^2$/s.

23. The rolling bearing as claimed in claim 20, wherein the content of the lubricant containing a polar group with a kinematic viscosity at 40° C. of 2,000 to 100,000 mm$^2$/s in said base oil is 5 to 30% by mass of the total amount of said base oil.

* * * * *